(12) United States Patent
Park et al.

(10) Patent No.: US 10,160,288 B2
(45) Date of Patent: Dec. 25, 2018

(54) HEATING SYSTEM OF HYBRID VEHICLE

(71) Applicants: Hyundai Motor Company, Seoul (KR); Kia Motors Corp., Seoul (KR); Halla Visteon Climate Control Corp., Daejeon (KR)

(72) Inventors: Hee Sang Park, Seoul (KR); Yong Soo Chang, Seoul (KR); Bock Cheol Lee, Suwon-Si (KR); In Keun Kang, Daejeon (KR)

(73) Assignees: Hyundai Motor Company, Seoul (KR); Kia Motors Corp., Seoul (KR); Halla Visteon Climate Control Corp., Daejeon (KR)

( * ) Notice: Subject to any disclaimer, the term of this patent is extended or adjusted under 35 U.S.C. 154(b) by 538 days.

(21) Appl. No.: 14/563,210

(22) Filed: Dec. 8, 2014

(65) Prior Publication Data

US 2015/0360539 A1  Dec. 17, 2015

(30) Foreign Application Priority Data

Jun. 11, 2014  (KR) .................. 10-2014-0070766

(51) Int. Cl.
| | |
|---|---|
| *B60H 1/04* | (2006.01) |
| *B60H 1/00* | (2006.01) |
| *B60H 1/03* | (2006.01) |

(52) U.S. Cl.
CPC ......... *B60H 1/00885* (2013.01); *B60H 1/004* (2013.01); *B60H 1/034* (2013.01)

(58) Field of Classification Search
CPC ............... B60H 1/00885; B60H 1/004; B60H 1/00571; B60H 1/03; B60H 1/04; B60H 1/143; B60H 2001/00307

(Continued)

(56) References Cited

U.S. PATENT DOCUMENTS

| | | | | | |
|---|---|---|---|---|---|
| 5,407,130 | A | * | 4/1995 | Uyeki ................ | B60H 1/00492 165/42 |
| 5,725,048 | A | * | 3/1998 | Burk .................. | B60H 1/00392 237/12.3 A |

(Continued)

FOREIGN PATENT DOCUMENTS

| | | |
|---|---|---|
| JP | 6-24238 A | 2/1994 |
| JP | 10-86645 A | 4/1998 |

(Continued)

OTHER PUBLICATIONS

Morita, et al., JP 2011-157035 A English machine translation, Aug. 18, 2011.*

*Primary Examiner* — Gregory Huson
*Assistant Examiner* — Phillip E Decker
(74) *Attorney, Agent, or Firm* — Morgan, Lewis & Bockius LLP

(57) ABSTRACT

A heating system for a hybrid vehicle may include a first heating line connecting an engine, having a temperature which is controlled through water-cooling, to a heater core that is heated using a heat generated from the engine, a second heating line allowing for heat exchange between various electronic devices and an auxiliary radiator controlling the temperatures of the various electronic devices, a branch line connected to the first heating line and the second heating line and exchanging heat therebetween, a plurality of valves provided on each of the first heating line, the second heating line, and the branch line, and a controller controlling each valve.

8 Claims, 6 Drawing Sheets

(58) Field of Classification Search
USPC .......................... 237/2 A, 8 A, 8 C, 12.3 B
See application file for complete search history.

(56) References Cited

U.S. PATENT DOCUMENTS

| | | | | |
|---|---|---|---|---|
| 6,450,275 | B1* | 9/2002 | Gabriel | B60K 6/22 165/41 |
| 6,467,286 | B2* | 10/2002 | Hasebe | B60K 1/02 165/41 |
| 6,491,001 | B1* | 12/2002 | Dean | F01P 7/165 123/41.29 |
| 6,616,059 | B2* | 9/2003 | Sabhapathy | B60H 1/04 237/12.3 B |
| 6,810,977 | B2* | 11/2004 | Suzuki | F02N 19/10 123/41.14 |
| 7,147,071 | B2* | 12/2006 | Gering | B60H 1/00278 237/12.3 B |
| 7,168,398 | B2* | 1/2007 | Ap | F01P 7/165 123/41.1 |
| 7,779,639 | B2* | 8/2010 | Goenka | B60H 1/004 136/204 |
| 8,006,655 | B2* | 8/2011 | Hiyama | B60H 1/00314 123/41.08 |
| 8,215,427 | B2* | 7/2012 | Rouaud | B60K 6/26 701/22 |
| 8,688,322 | B2* | 4/2014 | Shigyo | B60H 1/00421 454/159 |
| 9,649,910 | B2* | 5/2017 | Lundberg | B60H 1/00764 |
| 10,035,404 | B2* | 7/2018 | Patel | B60H 1/00885 |
| 2002/0053216 | A1* | 5/2002 | Ap | B60K 1/04 62/323.1 |
| 2004/0045749 | A1* | 3/2004 | Jaura | B60K 6/22 180/65.26 |
| 2004/0163861 | A1* | 8/2004 | Fukuda | B60K 6/22 180/65.26 |
| 2005/0167169 | A1* | 8/2005 | Gering | B60H 1/00278 237/12.3 B |
| 2006/0060340 | A1* | 3/2006 | Busse | B60H 1/00278 165/202 |
| 2006/0081355 | A1* | 4/2006 | Horstmann | B60H 1/025 165/43 |
| 2008/0028768 | A1* | 2/2008 | Goenka | B60H 1/004 62/3.2 |
| 2008/0236185 | A1* | 10/2008 | Choi | F25B 7/00 62/332 |
| 2009/0133415 | A1* | 5/2009 | Major | B60H 1/004 62/115 |
| 2010/0012741 | A1* | 1/2010 | Nemesh | B60H 1/00392 237/2 A |
| 2010/0155018 | A1* | 6/2010 | Goenka | B60H 1/00278 165/59 |
| 2010/0243215 | A1* | 9/2010 | Cimatti | B60K 6/40 165/104.31 |
| 2012/0048504 | A1* | 3/2012 | Park | B60H 1/00778 165/41 |
| 2012/0104843 | A1* | 5/2012 | Füchtner | B60H 1/00278 307/9.1 |
| 2012/0173063 | A1* | 7/2012 | Madurai Kumar | B60K 6/48 701/22 |
| 2012/0205088 | A1* | 8/2012 | Morisita | B60H 1/00921 165/202 |
| 2012/0225341 | A1* | 9/2012 | Major | B60H 1/00278 429/120 |
| 2012/0241129 | A1* | 9/2012 | Kohl | B60H 1/00278 165/58 |
| 2012/0247716 | A1* | 10/2012 | Galtz | B60H 1/00278 165/42 |
| 2013/0269911 | A1* | 10/2013 | Carpenter | F28D 1/0408 165/104.13 |
| 2013/0288853 | A1* | 10/2013 | Miyazaki | B60K 6/48 477/5 |
| 2014/0174087 | A1* | 6/2014 | Mizoguchi | F01K 23/065 60/670 |
| 2014/0230463 | A1* | 8/2014 | Ziehr | F25B 49/022 62/56 |
| 2014/0326430 | A1* | 11/2014 | Carpenter | B60L 11/1874 165/41 |
| 2015/0191101 | A1* | 7/2015 | Rawlinson | B60L 11/1874 429/62 |
| 2016/0102601 | A1* | 4/2016 | Hosokawa | F01P 7/14 123/41.08 |
| 2016/0201549 | A1* | 7/2016 | Kim | F01P 7/165 123/41.1 |
| 2017/0167355 | A1* | 6/2017 | Kim | B60K 11/02 |
| 2017/0253105 | A1* | 9/2017 | Allgaeuer | B60H 1/00278 |
| 2017/0282676 | A1* | 10/2017 | Janier | B60K 11/02 |
| 2018/0170144 | A1* | 6/2018 | Yang | B60K 11/02 |

FOREIGN PATENT DOCUMENTS

| | | |
|---|---|---|
| JP | 2003-184721 A | 7/2003 |
| JP | 2008-133755 A | 6/2008 |
| JP | 2011-098628 A | 5/2011 |
| JP | 2011-157035 A | 8/2011 |
| KR | 10-2002-0004397 A | 1/2002 |
| KR | 10-2007-0110603 A | 11/2007 |

* cited by examiner

HEATING SYSTEM OF HYBRID VEHICLE

CROSS-REFERENCE TO RELATED APPLICATION

The present application claims priority to Korean Patent Application Number 10-2014-0070766 filed Jun. 11, 2014, the entire contents of which is incorporated herein for all purposes by this reference.

BACKGROUND OF THE INVENTION

Field of the Invention

The present invention relates to a heating system of a hybrid vehicle in which the heat generated from an engine is stored in various electronic devices and the cooling lines thereof to be used as a heating source in the hybrid vehicle.

Description of Related Art

Generally, a hybrid vehicle is driven by selecting one of an engine driving force using a fossil fuel and a motor driving force using electrical energy, or by using both of them.

That is, a hybrid vehicle implements an engine driving mode where a vehicle is driven using only an engine driving source, an electric vehicle (EV) driving mode where a vehicle is driven using only a motor driving source, and a hybrid electric vehicle (HEV) driving mode where a vehicle is driven using both powers from an engine and a motor in accordance with the driving situations.

In the hybrid vehicle an interior heating system, as shown in FIG. 1, is provided with a heater core 1, an engine 3, an engine cooling loop 10 that is connected to a radiator 7 such that cooling water is circulated, and an electronic device cooling loop 20 that is separately prepared to be connected to various front components 23 and an auxiliary radiator 27 for cooling them such that cooling water is circulated.

According to the conventional heating system for a hybrid vehicle as configured above, the heat generated from an engine is transferred toward the heater core when a heating operation is needed on a driving mode to heat the interior of a vehicle. Even in a case where the driving mode is converted into the EV driving mode where a vehicle is driven using only motor when an engine stops, the interior of a vehicle is heated using the heat remained in the engine for a predetermined time, however, the engine needs to be re-started in accordance with the decreasing of the temperature of the engine.

Further, even though heat is generated through various electronic devices such as an inverter while a vehicle is driven on the EV driving mode, the heat is thrown out due to the cooling thereby to cause energy loss and further the heat generated as the temperature increases is cooled to be thrown out.

A separate heat storage system has been proposed in order to store the thrown out heat, however, separate structures have to be added so as to establish the heat storage system, thereby making the structure complicated and increasing unit costs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating system for a hybrid vehicle capable of increasing heating efficiency and reducing energy loss by storing the waste heat generated from an engine when the heating for a hybrid vehicle is conducted and using the stored heat as a heating source.

According to various aspects of the present invention a heating system for a hybrid vehicle may include a first heating line connecting an engine, having a temperature which is controlled through water-cooling, to a heater core that is heated using a heat generated from the engine, a second heating line allowing for heat exchange between various electronic devices and an auxiliary radiator controlling the temperatures of the various electronic devices, a branch line connected to the first heating line and the second heating line and exchanging heat therebetween, a plurality of valves provided on each of the first heating line, the second heating line, and the branch line and selectively exchanging heat between the first heating line and the second heating line, and a controller controlling each valve when a management temperature of an engine is a limitation temperature or more such that the heat generated from the engine is transferred to the second heating line from the first heating line and stored in the second heating line.

The branch line may include a first branch line branched from a first branch point at an inlet of the auxiliary radiator along the second heating line and connected to a second branch point at an inlet of the heater core of the first heating line, and a second branch line branched from a third branch point at an outlet of the auxiliary radiator along the second heating line and connected to a fourth branch point at an outlet of the engine of the first heating line.

The plurality of valves may include first and second valves provided on the first branch line and the second branch line, respectively, a third valve provided between the second branch point to which the first branch line is connected and the fourth branch point to which the second branch line is connected at the first heating line, and a fourth valve provided between the first branch point to which the first branch line is connected at the second heating line and the auxiliary radiator.

The controller may control the third valve to be opened when an operation of heating is conducted while the engine is driven and the first and second valves to be closed so that the heat generated from the engine is transferred to the heater core.

The controller may control the third and fourth valves to be closed and the first and second valves to be opened in a case where the management temperature of the engine is a limitation temperature or more while the engine is driven so that the heat generated from the engine is transferred to the second heating line.

The controller may control the first and second valves to be closed and the third and fourth valves to be opened in a case where the management temperature of the various electronic devices is a limitation temperature or more by the heat transferred from the engine, thereby conducting cooling of the electronic devices.

The controller may determine, by comparing a heat availability of the engine with a heat availability of the electronic devices when the operation of heating is conducted while a vehicle travels in an EV mode where the driving of the engine is stopped, and when the heat availability of the engine is higher than the heat availability of the electronic device, the controller controls the first and second valves to be closed and the third valve to be opened, thereby conducting the operation of heating only with the heat from the engine.

The controller may control the first and second valves to be opened and the third and fourth valves to be closed so that the operation of heating is conducted with the heat generated from the engine and stored in an electronic device in case where the heat availability of the electronic device is higher than that of the engine.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
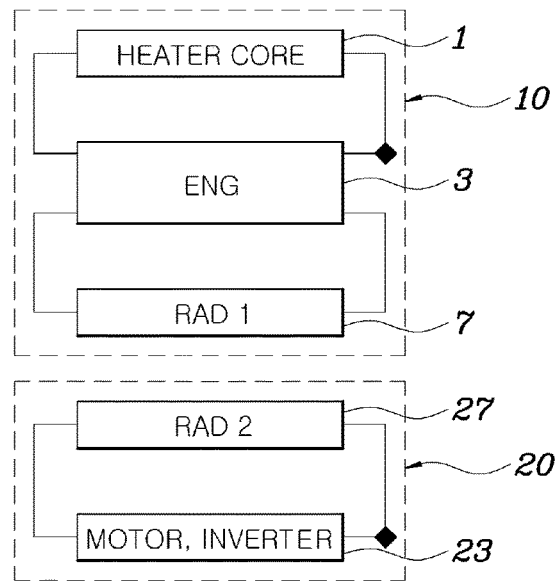
FIG. 1 is a block diagram illustrating a heating system for a hybrid vehicle according to a related art.
Figure 2:
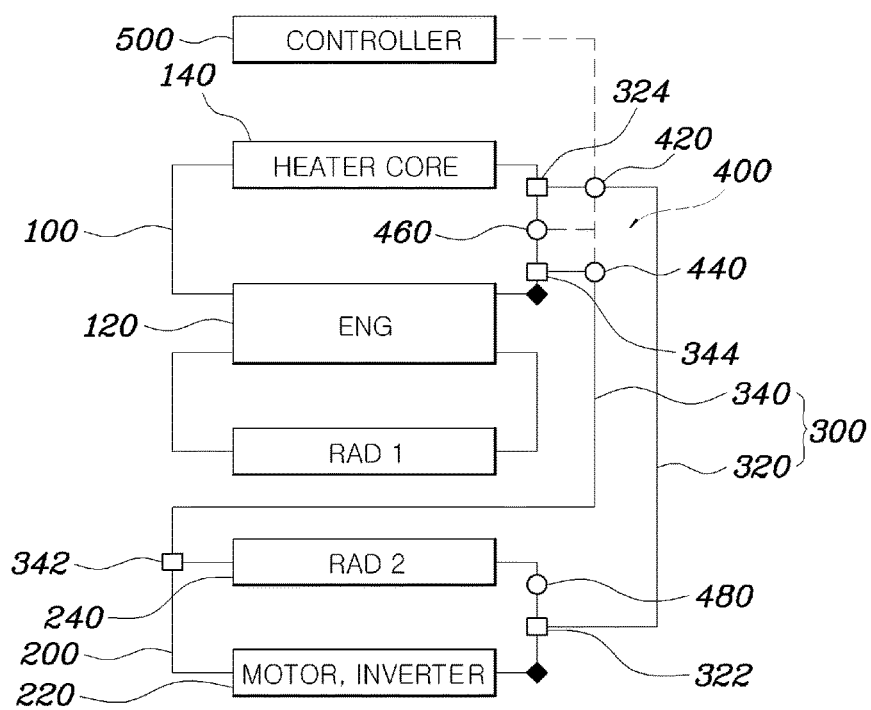
FIG. 2 is a block diagram illustrating an exemplary heating system for a hybrid vehicle according to the present invention.
Figure 3:
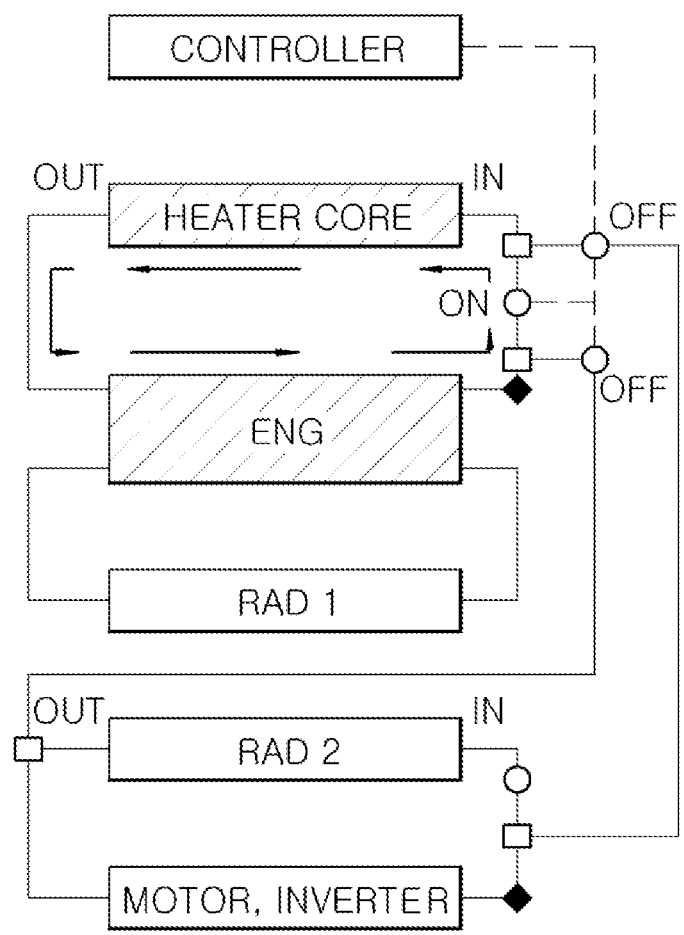
FIG. 3, FIG. 4, and FIG. 5. are block diagrams illustrating operation of the exemplary heating system for the hybrid vehicle as shown in FIG. 2.
Figure 4:
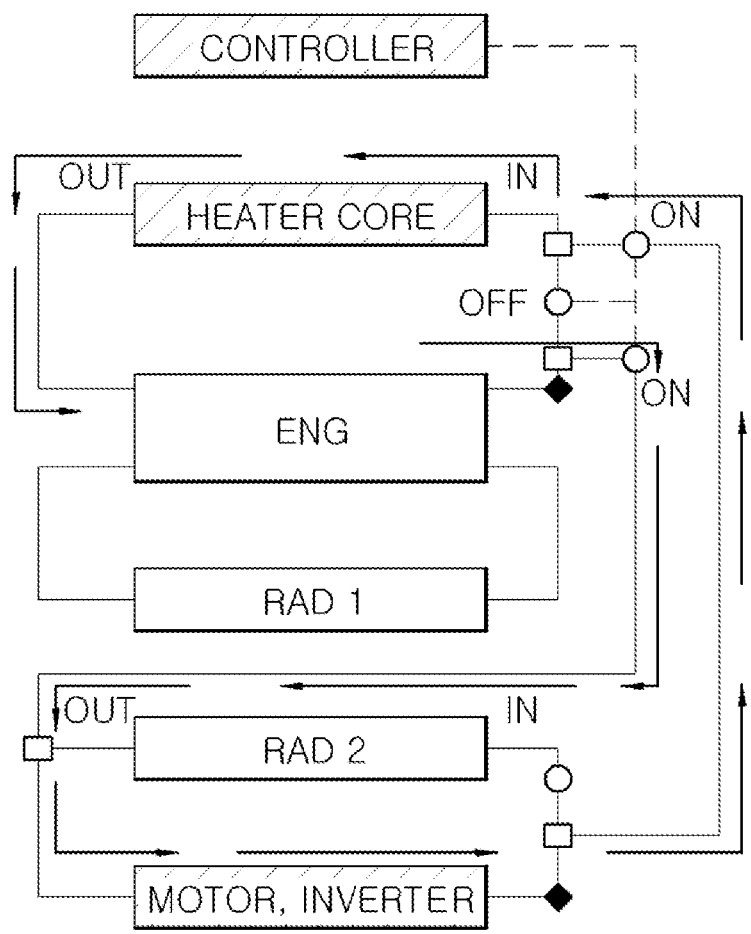
Figure 5:
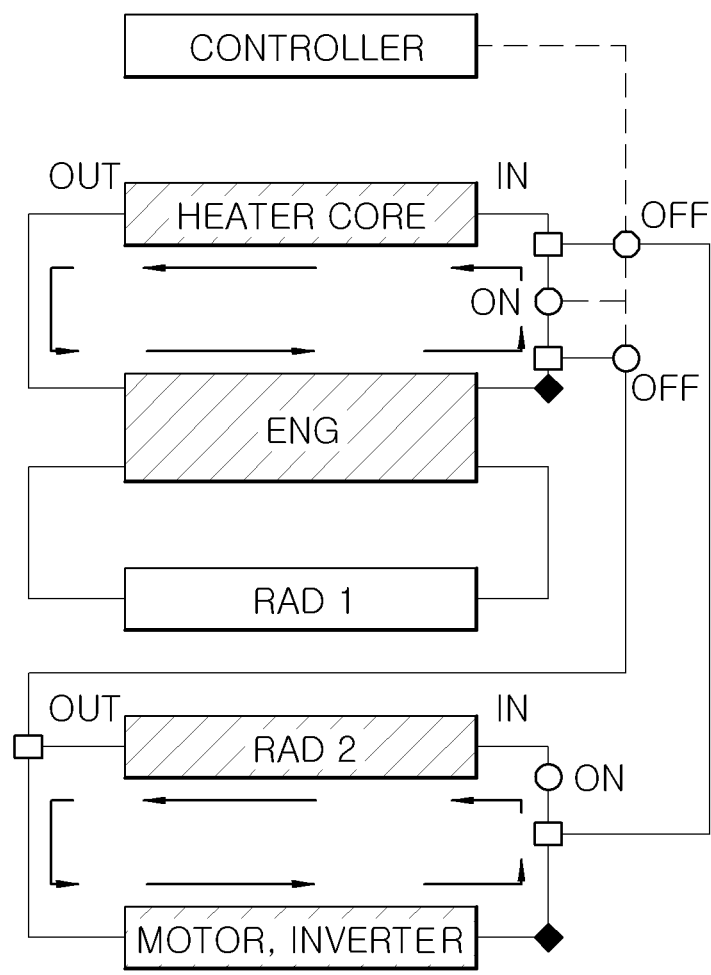

FIG. 2 is a block diagram illustrating a heating system for a hybrid vehicle according to various embodiments of the present invention and FIGS. 3 to 5 are block diagrams illustrating operation of the heating system for the hybrid vehicle according to the embodiment of the present invention.

The present invention aims at increasing heating efficiency when a hybrid vehicle needs to be heated. As shown in FIG. 2, a heating system for a hybrid vehicle according to various embodiments of the present invention may include a first heating line 100 for connecting an engine 120, a temperature of which is controlled through water-cooling to a heater core 140 that is heated using a heat generated from the engine 120, a second heating line 200 allowing for heat exchange between various electronic devices 220 and an auxiliary radiator 240 provided for controlling the temperatures of various electronic devices 220, a branch line 300 that is connected to the first heating line 100 and the second heating line 200 for exchanging heat therebetween, a valve 400 that is provided on each of the first heating line 100, the second heating line 200 and the branch line 300 and exchanges selectively heat between the first heating line 100 and the second heating line 200, and a controller 500 for controlling the valve 400 when a management temperature of the engine is a limitation temperature or more such that the heat from the engine 120 is transferred to the second heating line 200 from the first heating line 100 thereby to store the heat from the engine 120 in the second heating line 200.

The first heating line 100 is a cooling circulation path for allowing cooling water to be circulated between the engine 120 and the heater core 140. Here, the engine 120 is connected to the radiator so that the temperature thereof is controlled, and when the heated-water that is heated through the heat generated as the engine 120 is driven is transferred to the heater core 140, the heater core 140 having the transferred heat exchanges heat with air supplied to the interior to conduct heating.

The second heating line 200 connects the various electronic devices 220 to the auxiliary radiator 240. Here, the various electronic devices 220 refer to the components necessary for driving electrically some elements such as a motor and an inverter adapted for a hybrid vehicle, and the auxiliary radiator 240 serves to control the temperatures of various electronic devices 220 that are driven by receiving electric energy not to be increased excessively through the circulation of cooling water.

A pump may be provided on the first heating line 100 and the second heating line 200 for circulating cooling water.

In the present invention, the branch line 300 is connected to the first heating line 100 and the second heating line 200 to exchange heat therebetween so as to allow the cooling water between the first heating line 100 and the second heating line 200 to be circulated. Further, the valve 400 is provided on each of the first heating line 100, the second heating line 200, and the branch line 300 so as to allow heat exchange between the first heating line 100 and the second heating line 200 to be selectively achieved.

That is, according to the present invention, the cooling water can be circulated between the first heating line 100 and the second heating line 200 so that the heat generated from the engine 120 is transferred to the second heating line 200 from the first heating line 100 through the branch line 300, thereby increasing the temperatures at sides of the electronic devices 220 and the second heating line 200.

In more detail, according to the present invention, in a case where the management temperature of the engine is a limitation temperature or more, the heat from the engine 120 is transferred to the second heating line 200 from the first heating line 100 by controlling the valve 400 so that the heat from the engine 120 is to be stored in the second heating line 200.

That is, according to a related art, in a case where the heating is conducted while the engine 120 is driven, the heating for interior of a vehicle is performed using the heat generated from the engine 120 and when the management temperature of the engine is increased to a limitation temperature or more, the engine 120 is cooled through the circulation of cooling water and thus the heat generated from the engine 120 is thrown out. However, according to the present invention, the heat generated from the engine 120 is transferred to the second heating line 200, thereby increasing the self temperature of various electronic devices 220 and the temperature of the cooling water of the second heating line 200.

The increasing of the self temperature of various electronic devices 220 and the temperature of the cooling water of the second heating line 200 refers to the storage of heat transferred from the engine 120 and later the heating for the interior of a vehicle is to be conducted using the heat stored on the second heating line 200 when the heating is operated.

The management temperature of the engine is provided for maintaining the temperature of the engine 120 at a proper level and it may be provided by measuring and using the heat of the engine 120 itself and preferably by measuring and using the temperature of the cooling water. Further, the limitation temperature is temperature value for preventing damage to the engine 120.

In more detailed description of the present invention, as shown in FIG. 2, the branch line 300 may include a first branch line 320 that is branched from a first branch point 322 at an inlet of the auxiliary radiator 240 among the second heating line 200 to be connected to a second branch point 324 at an inlet of the heater core 140 of the first heating line 100, and a second branch line 340 that is branched from a third branch point 342 at an outlet of the auxiliary radiator 240 among the second heating line 200 to be connected to a fourth branch point 344 at an outlet of the engine 120 of the first heating line 100.

That is, as shown in FIG. 2, the cooling water that passes through the engine 120 passes through the second branch line 340 connected to the fourth branch point 344 at the first heating line 100 to be circulated to the second heating line 200, and the cooling water that circulates through the second heating line 200 passes through the first branch line 320 connected to the first branch point 322 is transferred back to the second heating line 200.

Here, the valve 400 is configured to selectively circulate the cooling water through the first heating line 100 and the second heating line 200 and further the valve 400 may include first and second valves 420, 440, which are provided on the first branch line 320 and the second branch line 340, respectively, a third valve 460 that is provided between the second branch point 324 to which the first branch line 320 is connected and the fourth branch point 344 to which the second branch line 340 is connected at the first heating line 100, and a fourth valve 480 that is provided between the first branch point 322 to which the first branch line 320 is connected at the second heating line 200 and the auxiliary radiator 240.

As described above, the cooling water is to be circulated selectively through the control of the plurality of valves provided on the first and second heating lines 100, 200 and the branch lines 300, respectively and thus efficient heating is to be conducted and energy is to be saved through the recovery of waste heat.

In more detail, the controller 500 controls the third valve 460 to be opened when heating is conducted while the engine 120 is driven and the first and second valves 420, 440 to be closed so that the heat generated from the engine 120 is transferred to the heater core 140.

That is, as shown in FIG. 3, the heat that is generated in accordance with the operation of the engine 120 when heating is conducted while a vehicle travels through driving the engine 120 is transferred to the heater core 140 through the first heating line 100 thereby to conduct heating of the interior of the vehicle. For this purpose, the controller controls the third valve 460 to be opened and the first and second valves 420, 440 to be closed so that the heating is conducted using the heat generated from the engine 120 by allowing the cooling water that circulates through the first heating line 100 not to be circulated toward the second heating line 200 through the branch line 300.

Meanwhile, the controller 500 controls the third and fourth valves 460, 480 to be closed and the first and second valves 420, 440 to be opened in a case where the management temperature of the engine is a limitation temperature or more while the engine 120 is driven, as shown in FIG. 4, so that the heat generated from the engine 120 is transferred to the second heating line 200.

That is, the controller controls the third and fourth valves 460, 480 to be closed and the first and second valves 420, 440 to be opened when the management temperature of an engine approaches to the limitation temperature and thus the radiation is determined to be necessary, so that the heat generated from the engine 120 is transferred to the second heating line 200 and the temperatures of various electronic devices 220 provided on the second heating line 200 are increased.

When the cooling water of the first heating line 100, the temperature of which is increased by the engine 120, passes through the second branch line 340 and circulates through the second heating line 200, the self temperatures of various electronic devices 220 provided on the second heating line 200 are increased and thus the heat from the engine 120 is stored in various electronic devices 220. Further, the temperature of the cooling water of the second hating line 200 is also increased and thus the heat from the engine 120 is stored even in the second heating line 200.

As described above, the cooling water the temperature of which is increased at the first heating line 100 passes through the second branch line 340 and then exchanges heat at the second heating line 200 and thus the temperature of the cooling water is decreased while storing heat at various electronic devices 220. Further, the cooling water the temperature of which is lowered passes through the first branch line 320 and then circulates through the first heating line 100 thereby to maintain the temperature of the engine 120 at a proper level.

Meanwhile, as shown in FIG. 5, the controller 500 controls the first and second valves 420, 440 to be closed and the third and fourth valves 460, 480 to be opened in a case where the management temperature of the electronic devices 220 is a limitation temperature or more by the heat transferred from the engine 120, thereby conducting the cooling of the electronic devices 220.

Here, the management temperature of the electronic device refers to a temperature value for maintaining the temperature of various electronic devices 220 at a proper level and it may be the temperature of the cooling water and further the limitation temperature is a temperature value for preventing damage to the electronic devices.

However, the engine 120 has stronger durability than the electronic device 220 at a higher temperature wherein the management temperature of the electronic device may be lower than that of the engine. For example, when it is assumed that the management temperature of an engine and the management temperature of the electronic device are the temperatures of cooling waters of the first heating line 100 and the second heating line 200, respectively, the limitation temperature with respect to the management temperature of an engine may be set as 100° C. and the limitation temperature with respect to the management temperature of the electronic device may be set as 65° C.

In the present invention, when the management temperature of the electronic device is the limitation temperature or more, as shown in FIG. 5, the first and second valves 420, 440 are to be closed and the third and fourth valves 460, 480 are to be opened so that the cooling water that circulates through the electronic devices is to pass through the radiator, thereby conducing the cooling of the electronic devices 220.

At this time, the heat from the engine 120 cannot to be stored in the electronic devices 220 and thus the cooling water is to be circulated through the electronic devices 220 and the auxiliary radiator 240 so as to maintain the management temperature of the electronic devices at a proper level. Further, the heat that is generated in accordance with the driving of the engine 120 is transferred to the heater core 140 through the circulation of the cooling water within the first heating line 100 thereby to conduct the heating of the interior of a vehicle and the temperature of the engine 120 is to be maintained at a proper level through the temperature control of the cooling water using the radiator in accordance with the management temperature of the engine.

Meanwhile, the controller 500 determines by comparing the heat availability of the engine with the availability of the electronic device when the operation of heating is conducted while a vehicle travels in an EV mode where the driving of the engine is stopped, and when the heat availability of the engine is higher than that of the electronic device, the controller controls the first and second valves 420, 440 to be closed and the third valve 460 to be opened, thereby conducting the heating only with the heat from the engine 120.

Here, the heat availability of the engine is a management temperature of the engine that is increased as the engine 120 is driven and the heat availability of the electronic device is a management temperature of the electronic device that is increased through heat exchanging. That is, the heat availability of the engine is measured using the deviation that is produced until the management temperature of the engine approaches the limitation temperature and the heat availability of the electronic device is measured using the deviation that is produced until the management temperature of the electronic device approaches the limitation temperature.

Here, the heat availability of the engine being high means a state where the management temperature of the engine almost approaches the limitation temperature, and when it is determined that the heat availability of the engine is higher than that of the electronic device by comparing them, the heating is conducted with the heat from the engine 120.

Accordingly, the controller 500 controls the first and second valves 420, 440 to be closed and the third valve 460 to be opened so that the heat from the engine 120 is transferred to the heater core 140 to conduct the heating of the interior of a vehicle even though the engine 120 is stopped.

Meanwhile, the controller 500 controls the first and second valves 420, 440 to be opened and the third and fourth valves 460, 480 to be closed so that the heating is conducted with the heat generated from the engine 120 and stored in the electronic devices 220, in case where the heat availability of the electronic device is higher than that of the engine.

That is, when the heat generation is stopped as the driving of the engine is stopped under a situation where a vehicle travels in an EV mode, it is difficult to conduct the heating of the interior with the heat from the engine 120 and thus the heating of the interior of a vehicle is conducted with the heat stored in the electronic devices 220.

For this purpose, the controller 500 controls the first and second valves 420, 440 to be opened and the third and fourth valves 460, 480 to be closed so that the cooling water passes through the second branch line 340 from the first heating line 100 and exchanges heat with the electronic device 220 provided on the second heating line 200, and thus the temperature of the cooling water is increased and the cooling water the temperature of which is increased passes through the first branch line 320 and is again circulated to the first heating line 100 and thus provides warm water to the heater core 140, thereby conducting the heating of the interior of a vehicle.

As described above, the waste heat is stored in the electronic devices 220 of the second heating line 200 when a vehicle travels in an EV mode and the stored heat is provided as a heat source for the heating, thereby improving energy efficiency and heating efficiency and reducing the driving number of the engine 120 for the heating to decrease energy loss.

Figure 6:
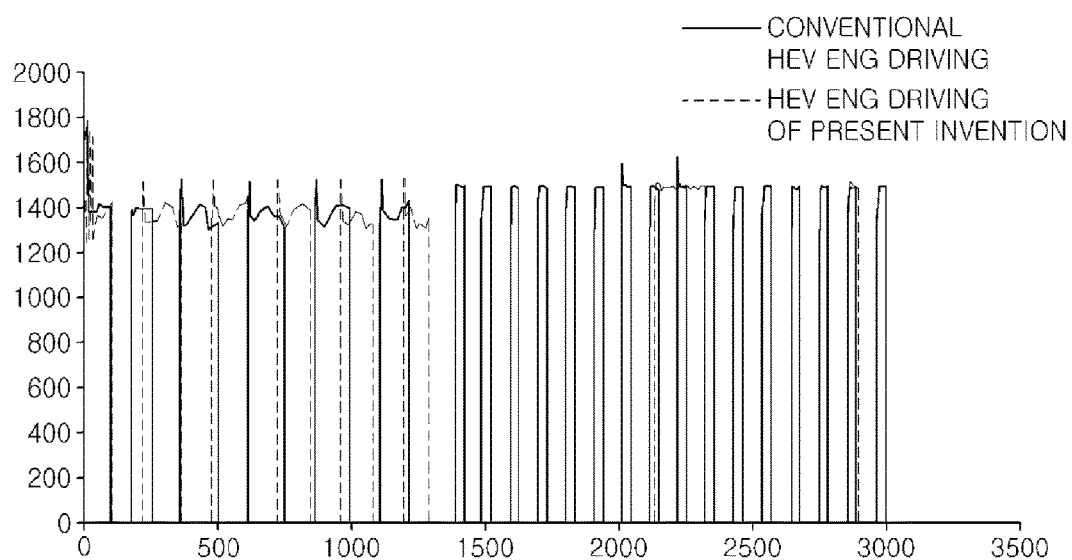
FIG. 6 is a graph illustrating the effect of the exemplary heating system for the hybrid vehicle as shown in FIG. 2.
Figure 7:
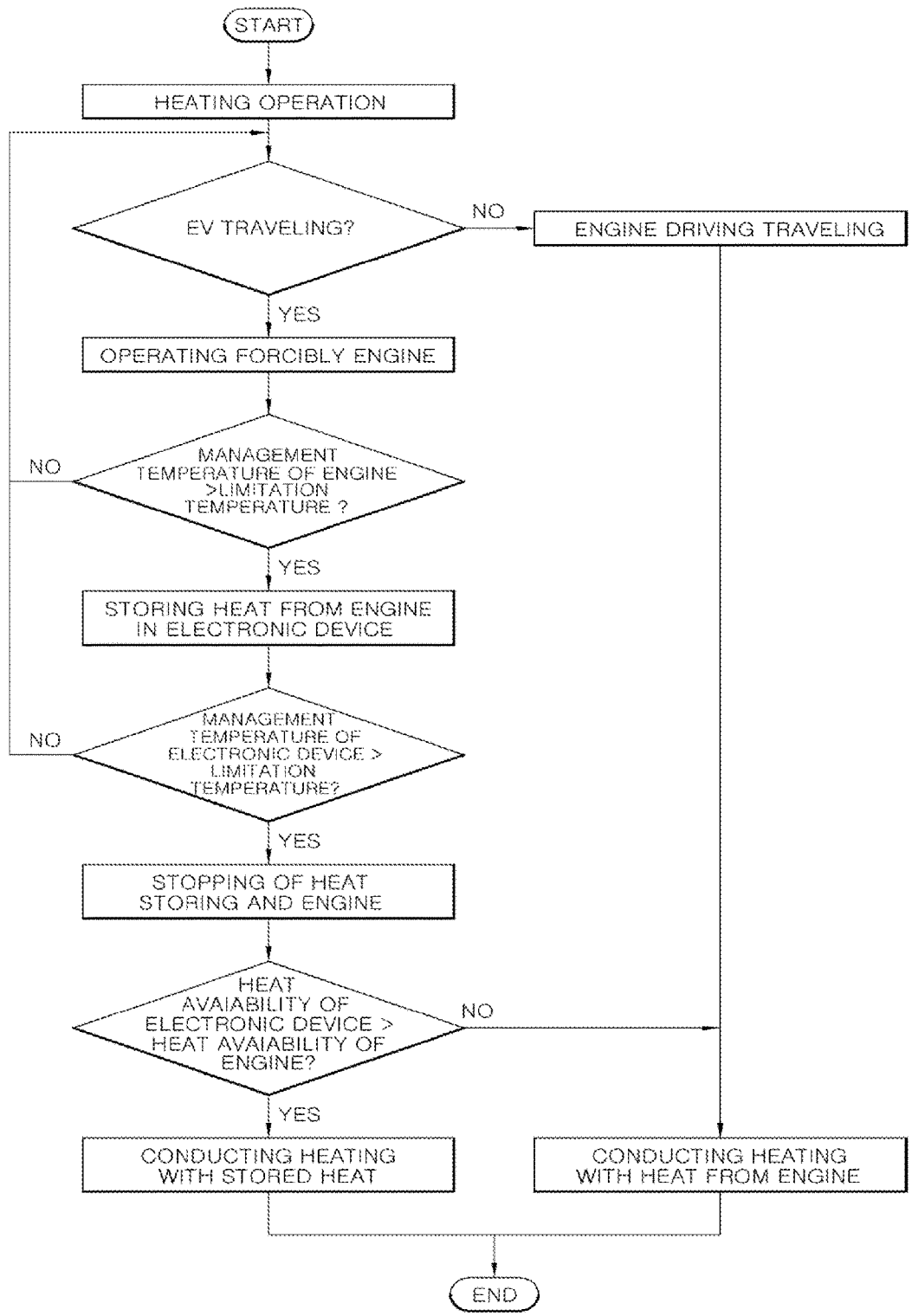
FIG. 7 is a flowchart illustrating a method for controlling the exemplary heating system for the hybrid vehicle as shown in FIG. 2.

As shown in FIG. 6, it is shown that in the case of a conventional heating system for a hybrid vehicle, the engine has to be driven 15 times or more so as to continuously conduct the heating when entering into an EV mode after the engine is driven while the heating is conducted, however, in the case of the heating system for a hybrid vehicle according to the present invention, the heating is conducted using the heat from the engine and the heat stored in the electronic devices 220, and thus is conducted even if an engine is driven only about twice.

According to the heating system for a hybrid vehicle as configured above, the waste heat generated from an engine when the heating for a hybrid vehicle is conducted is stored in various electronic devices of a hybrid system and the heat stored in the electronic devices and the cooling line for cooling it is used as a heating source, thereby increasing heating efficiency and reducing energy loss to efficiently use energy.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating system for a hybrid vehicle comprising:
a first heating line connecting, in series, an engine, having a temperature which is controlled through water-cooling, to a heater core that is heated using a heat generated from the engine;
a second heating line allowing for heat exchange between various electronic devices and an auxiliary radiator controlling the temperatures of the various electronic devices, wherein the various electronic devices include each of a motor and an inverter of the hybrid vehicle;
a branch line connected to the first heating line and the second heating line and exchanging heat therebetween;
a plurality of valves provided on each of the first heating line, the second heating line, and the branch line and selectively exchanging heat between the first heating line and the second heating line; and
a controller controlling each valve of the plurality of valves to selectively close the branch line, when a management temperature of the engine is a limitation temperature or more such that the heat generated from the engine is transferred to the second heating line from the first heating line, wherein the transferred heat increases a temperature of each of the various electronic devices and a temperature of cooling water in the second heating line and is stored in the second heating line by selectively closing the branch line,
wherein the branch line includes:
a first branch line branched from a first branch point at an inlet of the auxiliary radiator along the second heating line and connected to a second branch point at an inlet of the heater core of the first heating line; and
a second branch line branched from a third branch point at an outlet of the auxiliary radiator along the second heating line and connected to a fourth branch point at an outlet of the engine of the first heating line,
wherein the plurality of valves includes:
a first valve provided on the first branch line between the first branch point and the second branch point and a second valve provided on the second branch line between the third branch point and the fourth branch point;
a third valve provided at the first heating line between the second branch point to which the first branch line is connected at the first heating line and the fourth branch point to which the second branch line is connected at the first heating line; and
a fourth valve provided between the first branch point to which the first branch line is connected at the second heating line and the auxiliary radiator, and
wherein a pump is provided on each of the first heating line and the second heating line for circulating the cooling water.

2. The heating system for the hybrid vehicle of claim 1, wherein the controller controls the third valve to be opened when an operation of heating is conducted while the engine is driven and the first and second valves to be closed so that the heat generated from the engine is transferred to the heater core.

3. The heating system for the hybrid vehicle of claim 1, wherein the controller controls the third and fourth valves to be closed and the first and second valves to be opened in a case where the management temperature of the engine is the limitation temperature or more while the engine is driven so that the heat generated from the engine is transferred to the second heating line.

4. The heating system for the hybrid vehicle of claim 1, wherein the controller controls the first and second valves to be closed and the third and fourth valves to be opened in a case where the management temperature of the various electronic devices is the limitation temperature or more by the heat transferred from the engine, thereby conducting cooling of the electronic devices.

5. The heating system for the hybrid system of claim 4, wherein the limitation temperature of the management temperature of the various electronic devices is lower than the limitation temperature of the management temperature of the engine.

6. The heating system for the hybrid vehicle of claim 1, wherein the controller determines, by comparing a heat availability of the engine with a heat availability of the electronic devices, when the operation of heating is conducted while a vehicle travels in an EV mode where the driving of the engine is stopped, and when the heat availability of the engine is higher than the heat availability of the electronic device, the controller controls the first and second valves to be closed and the third valve to be opened, thereby conducting the operation of heating only with the heat from the engine.

7. The heating system for a hybrid vehicle of claim 6, wherein the controller controls the first and second valves to be opened and the third and fourth valves to be closed so that the operation of heating is conducted with the heat generated from the engine and stored in the electronic devices in the case where the heat availability of the electronic device is higher than the heat availability of the engine.

8. The heating system for the hybrid system of claim 1, wherein the engine and the heater core selectively form a closed loop in the first heating line.

* * * * *